April 26, 1955 — E. H. W. SCHMIDT — 2,706,890
PRODUCTION OF STEAM UNDER PRESSURE
Filed May 15, 1950
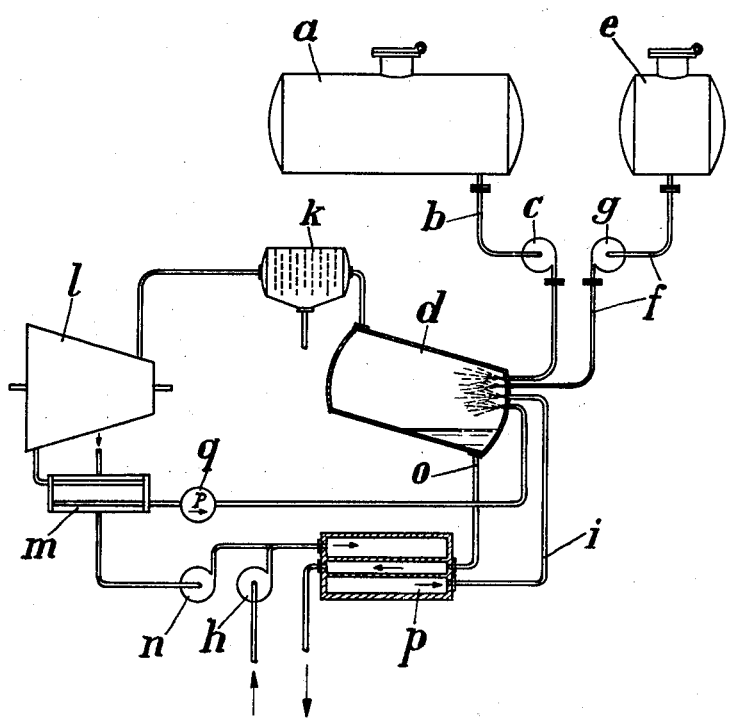

United States Patent Office 2,706,890
Patented Apr. 26, 1955

2,706,890

PRODUCTION OF STEAM UNDER PRESSURE

Ernst Heinrich Wilhelm Schmidt, Braunschweig, Germany

Application May 15, 1950, Serial No. 162,100

4 Claims. (Cl. 60—50)

The common method for the production of steam under pressure is the evaporation of water in a boiler heated by the combustion of a fuel with atmospheric air. In this way a great volume of combustion gas is produced which has to be removed and to be replaced by fresh air. This method is unsuitable or even impossible, if the room housing the installation is closed or can be ventilated only with difficulty. Such conditions are given in plants submerged under water, in caissons for foundations, in mines, etc.

The above said disadvantages of the known methods of producing steam in boilers are avoided by my invention using the exothermic reaction of a metal producing an oxide or an hydroxide in the presence water and/or oxygen. The metal may be used in liquid or solid state, the oxygen as compressed or liquefied gas or in the form of a chemical compound easily delivering oxygen, as for instance hydrogen peroxide. Preferably suitable for this new method are metals of low atomic weight as for instance lithium, sodium, potassium, aluminum or magnesium which may be used also as mixtures or as alloys. The output of energy per unit weight of the metal is the higher the smaller the atomic weight. Especially rich in energy is lithium with the atomic weight 6.94. It is followed by magnesium, aluminum, sodium and potassium.

Particularly suitable is the use of sodium, potassium or lithium on account of their low melting points which make it possible to keep the metal in liquid state, to transport it in pipes and to inject it into the reaction chamber held under pressure. The products of the reaction are alkali hydroxides with a low melting point, soluble in water, which may be removed easily in liquid state.

Lithium has the highest output in energy but it is more expensive and needs more storage room than sodium due to its low specific weight. Furthermore, it has a higher melting point than sodium. Balancing the pro and cons of lithium and sodium, presumably in many cases sodium is preferable.

If metallic sodium and water come together sodium hydroxide and hydrogen are formed with substantial development of heat. If more water is supplied than necessary for the chemical reaction the surplus evaporates and a mixture of superheated steam and hydrogen is produced the pressure and temperature of which depend on the excess of water. In this way steam results which may be used for instance in steam turbines. The hydrogen content of the steam can be avoided by feeding a suitable amount of oxygen into the reaction chamber. In this way the hydrogen is converted into water vapour which, after having passed the turbine, can be liquefied in a condenser. The oxygen may be used in gaseous state under pressure as a liquid or in form of a chemical compound easily delivering oxygen. For instance, hydrogen peroxide is such a componud which can be transported in aluminum containers without difficulty.

The sodium hydroxide produced by the reaction can be removed easily as it is in liquid state containing more or less water at the temperature in question. The steam after being used for driving a steam engine or turbine may be condensed in a condenser cooled by water and returned to the cycle.

Ozone is still better than oxygen because it has a greater output of energy per unit weight and its boiling point is not so low. However, pure ozone decomposes easily into oxygen, but mixtures of oxygen and ozone are stable enough and may be used profitably. Instead of sodium any other of the above said metals or a mixture of them may be used.

The drawing shows diagrammatically an installation which may be used in carrying out my method for instance with liquid sodium and liquid oxygen. In the figure $a$ represents a container filled with liquid sodium held at a temperature high enough to avoid solidification of the metal. The liquid metal flows through the pipe $b$ and is injected into the reaction chamber $d$ with the help of a pump $c$. A second container $e$ is filled with liquid oxygen which is injected into the reaction chamber by way of the pipe $f$ with the help of the pump $g$. A suitable amount of water is fed from outside and from the condenser into the chamber $d$ with the help of the pumps $h$ and $n$. These three substances sodium, oxygen and water react with each other following the equation.

$$2Na + H_2O + \tfrac{1}{2}O_2 = 2NaOH$$

and the heat of the reaction is used to evaporate and superheat a suitable surplus of water. The superheated vapour of perhaps 50 atm. and 550° C. after having been deprived if necessary in the purifier $k$ from liquid droplets of sodium hydroxide taken with it, drives the turbine $l$ producing mechanical power, and is liquefied in the condenser $m$. The condensed water is fed back to the reaction chamber $d$ with the help of the pump $n$ and the pipe $i$ together with the water taken from outside by the pump $h$. The sodium hydroxide produced in the reaction chamber leaves it in liquid state presumably mixed with more or less water by way of a tube $o$ and a heat exchanger $p$ transmitting its heat to the water entering the reaction chamber.

If the reaction is not complete due to small deviations of the sodium oxygen ratio from the theoretical value some gaseous hydrogen or oxygen may accumulate in the condenser $m$. To avoid the deterioration of the vacuum by this gas accumulation, a gas pump $q$ similar to the usual air pump of a condenser is provided carrying back the gas to the reaction chamber $d$. An automatic controlling device may be arranged to reduce the sodium oxygen ratio to its right value if too much hydrogen or oxygen is in the condenser.

Having thus described my invention I claim and desire to secure by Letters Patent:

1. In a power plant operating on steam, the use of a fuel for the steam generator chosen from the group consisting of lithium, sodium, potassium, aluminum, and magnesium, by a process comprising continually supplying water and a fuel chosen from said group at a predetermined rate to the steam generator for reacting the same into hydrogen and an hydroxide of the fuel, continually introducing a supply of oxygen into the gaseous products of said reaction at a rate providing substantially the necessary chemical equivalents of oxygen to react substantially completely with substantially all the hydrogen present for the production of a gaseous product consisting substantially wholly of steam, continually withdrawing the hydroxide reaction product from the generator, the water present in the generator being maintained in excess of that required for reaction with the metal for conversion into additional steam by the exothermic heat of the reactions, and applying said steam to a motor means for power purposes.

2. A process as defined in claim 1 wherein said supply of oxygen is oxygen in the elemental form.

3. A process as defined in claim 1 wherein said supply of oxygen is a mixture of ozone and oxygen.

4. A process as defined in claim 1 wherein said supply of oxygen is a water solution of hydrogen peroxide.

References Cited in the file of this patent

UNITED STATES PATENTS

| | | |
|---|---|---|
| 515,500 | Nobel | Feb. 27, 1894 |
| 1,532,930 | O'Neill | Apr. 7, 1925 |
| 1,961,787 | Roe | June 5, 1934 |
| 2,083,648 | Gorke | Jan. 15, 1937 |

(Other references on following page)

UNITED STATES PATENTS

| | | |
|---|---|---|
| 2,200,906 | Wood | May 14, 1940 |
| 2,392,235 | Edwards | Jan. 1, 1946 |
| 2,392,236 | Edwards | Jan. 1, 1946 |
| 2,484,221 | Gulbransen | Oct. 11, 1949 |
| 2,488,485 | Winternitz | Nov. 15, 1949 |

FOREIGN PATENTS

| | | |
|---|---|---|
| 317,928 | Germany | Jan. 8, 1920 |
| 23,370 | Great Britain | Dec. 1, 1894 |
| 574,360 | Great Britain | Jan. 2, 1946 |
| 612,322 | Great Britain | Nov. 11, 1948 |

OTHER REFERENCES

J. W. Mellor: "Comprehensive Treatise on Inorganic and Theoretical Chemistry," vol. 2, 1922 ed., page 469 and 501, published by Longmans, Green & Co., New York.

McPherson and Henderson: "A Course in General Chemistry," 3rd ed., page 84, published by Ginn & Co., New York.